United States Patent [19]
Duncan

[11] Patent Number: 6,000,637
[45] Date of Patent: Dec. 14, 1999

[54] HIGH PRESSURE WATER GUN

[76] Inventor: Gordon Duncan, 3450 Jefferson Blvd., West Sacramento, Calif. 95691

[21] Appl. No.: 09/009,776

[22] Filed: Jan. 20, 1998

[51] Int. Cl.$^6$ ................................................ B05B 15/06
[52] U.S. Cl. .......................... 239/526; 239/532; 239/570; 137/489.5; 137/495
[58] Field of Search ................................. 239/124, 570, 239/526, 532; 137/489.5, 489, 495

[56] References Cited

U.S. PATENT DOCUMENTS

| | | | |
|---|---|---|---|
| 2,158,478 | 5/1939 | Parker | 137/491 |
| 2,500,888 | 3/1950 | Wilhelm | 137/491 |
| 2,793,075 | 5/1957 | Galick | 239/570 |
| 3,468,336 | 9/1969 | Barrett et al. | 137/489 |
| 4,052,008 | 10/1977 | Rogers | 239/570 |
| 4,167,247 | 9/1979 | Sons et al. | 239/570 |
| 4,349,154 | 9/1982 | Pacht | 239/124 |
| 4,406,383 | 9/1983 | Duncan | 222/495 |
| 4,948,048 | 8/1990 | Smith | 239/124 |

*Primary Examiner*—Kevin Weldon
*Attorney, Agent, or Firm*—Mark C. Jacobs

[57] ABSTRACT

A high pressure water gun for washing electrical insulators and other related articles, which gun has a barrel, a water inlet, a water outlet (nozzle), a pistol grip and a main body portion, which portion communicates with both the inlet and with a lower valve chamber separated from an upper piston chamber. A piston is vertically slidably mounted in the upper chamber. A check valve is slidably mounted horizontally in the lower chamber and is spring biased, when the gun is in the inoperative position. A port extends between the lower chamber and communicates with the upper chamber. Another port in the lower chamber communicates with the barrel. Water introduced into the inlet follows a dual path and ejects out of the nozzle with relatively little pull required on the trigger.

13 Claims, 6 Drawing Sheets

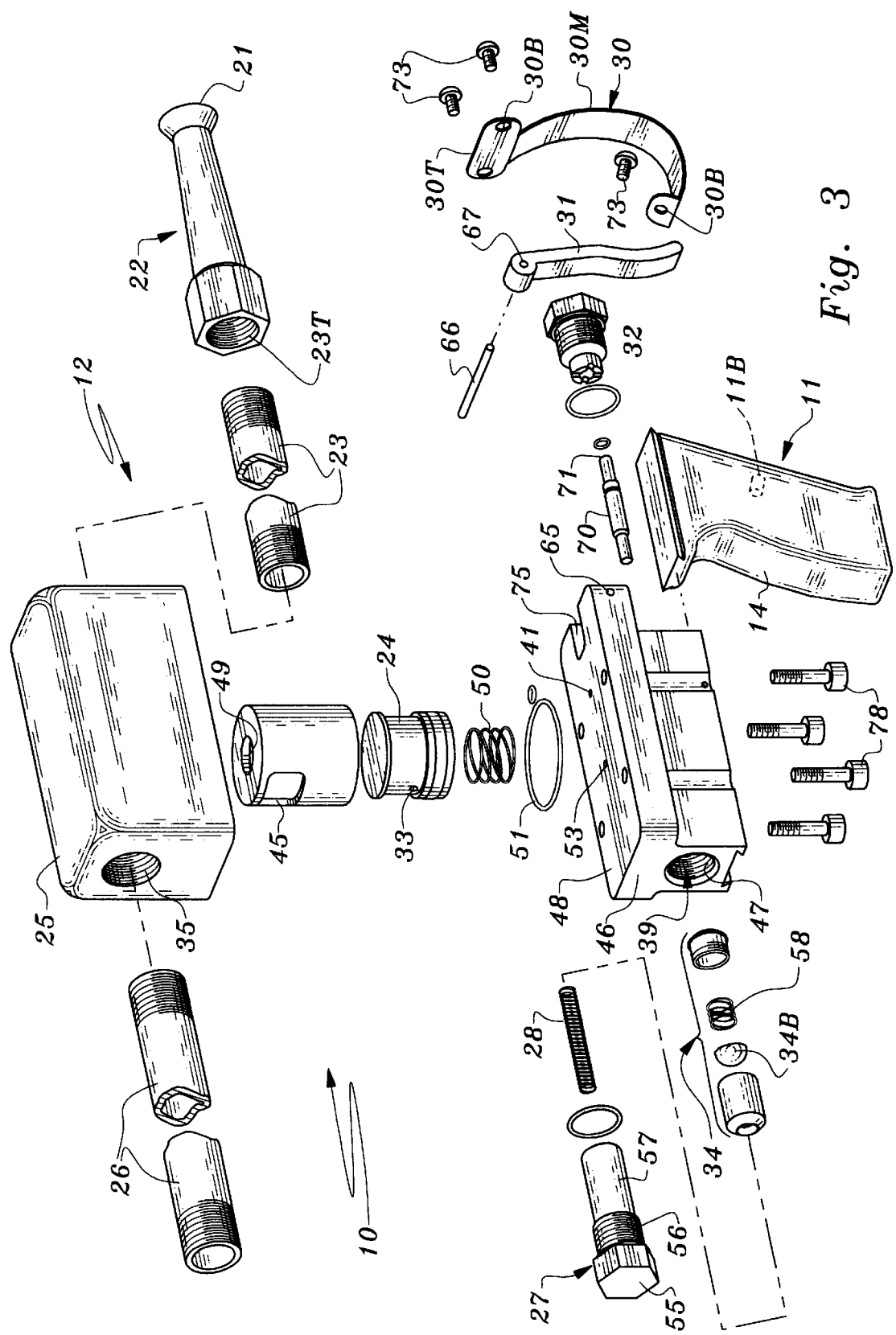

HIGH PRESSURE WATER GUN

BACKGROUND OF THE INVENTION

1. Field of the Invention

The invention relates to high pressure water guns; and, more particularly, to guns that eject water under high pressure to clean insulators of utility power lines or the like.

2. Description of the Prior Art

High pressure water guns are known in the art for ejecting a stream of water under relatively high pressure for cleaning various items, such as insulators of utility power lines or transformer cooling fins, as well as circuit breakers. Generally, such guns require a considerable amount of pressure and flow such as 600 pounds and 50 gallons per minutes to operate. These guns operate by being coupled to a high pressure water source such as a fire pump. Prior art guns require significant strength to operate and the use of both hands. Many prior guns have a large number of moving parts and require periodic servicing. In fact, many such guns, although relatively expensive, only last about six months out in the field and then have to be replaced.

One major improvement in this area was the invention of Duncan as recited and claimed in U.S. Pat. No. 4,406,383 issued Sep. 27, 1983. While that patented device made a significant improvement over the wash guns of the time, still the Duncan device has been found to have some drawbacks of its own, which could not be anticipated at the time such guns were first put into the marketplace.

For example, the Duncan 383 device utilizes lubricated O-rings. Field personnel tend to ignore the need to keep these O-rings lubricated so, leaks would arise, or the trigger would stick in the open position upon actuation.

While power companies try to utilize demineralized water in their cleaning efforts, sometimes this "pure" water is either not available or not utilized by uneducated personnel. The old Duncan design often corroded or suffered calcium or other deposit buildups from the water.

The earlier Duncan unit suffers from not being field repairable. Cleaning and maintenance are facility based not field based as is preferable.

There is thus a need for a water gun for cleaning insulators and other power company components which requires relatively light pressure and only one hand to operate, is simple and easy to manufacture and employs field replaceable parts.

An object of this invention therefore, is to provide an improved wash gun for use by the utility companies and others.

Another object is to provide a wash gun for cleaning electrical insulators that is easy to operate.

Yet another object is to provide a high pressure wash gun that can be field serviced.

Still another object is to provide a wash gun that ejects water under high pressure with relatively light operating pressure.

A yet further object of this invention is to provide a wash gun which is relatively maintenance free.

An additional object is to provide a high pressure water gun for cleaning insulators, cooling fins, etcetera, which gun is simple to manufacture and has a relatively long life.

These and other objects will in part appear herein, and will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 3 is a right facing exploded view of the apparatus of this invention.

SUMMARY OF THE INVENTION

The objects of the invention are preferably accomplished by providing a water gun having a barrel, a water inlet, a water outlet (nozzle), a pistol grip and a main body portion, which portion communicates with both the inlet and has a lower valve chamber separated from an upper piston chamber. A piston is slidably vertically mounted in the upper chamber. A check valve is slidably horizontally mounted in the lower chamber and is spring biased, when the gun is in the inoperative position. A port extends between the lower chamber and communicates with the upper chamber. A port in the lower chamber communicates with the barrel. Water introduced into the inlet follows a dual path and ejects out of the nozzle with relatively little pull required on the trigger, at high pressure.

DESCRIPTION OF THE PREFERRED EMBODIMENT

Figure 1:
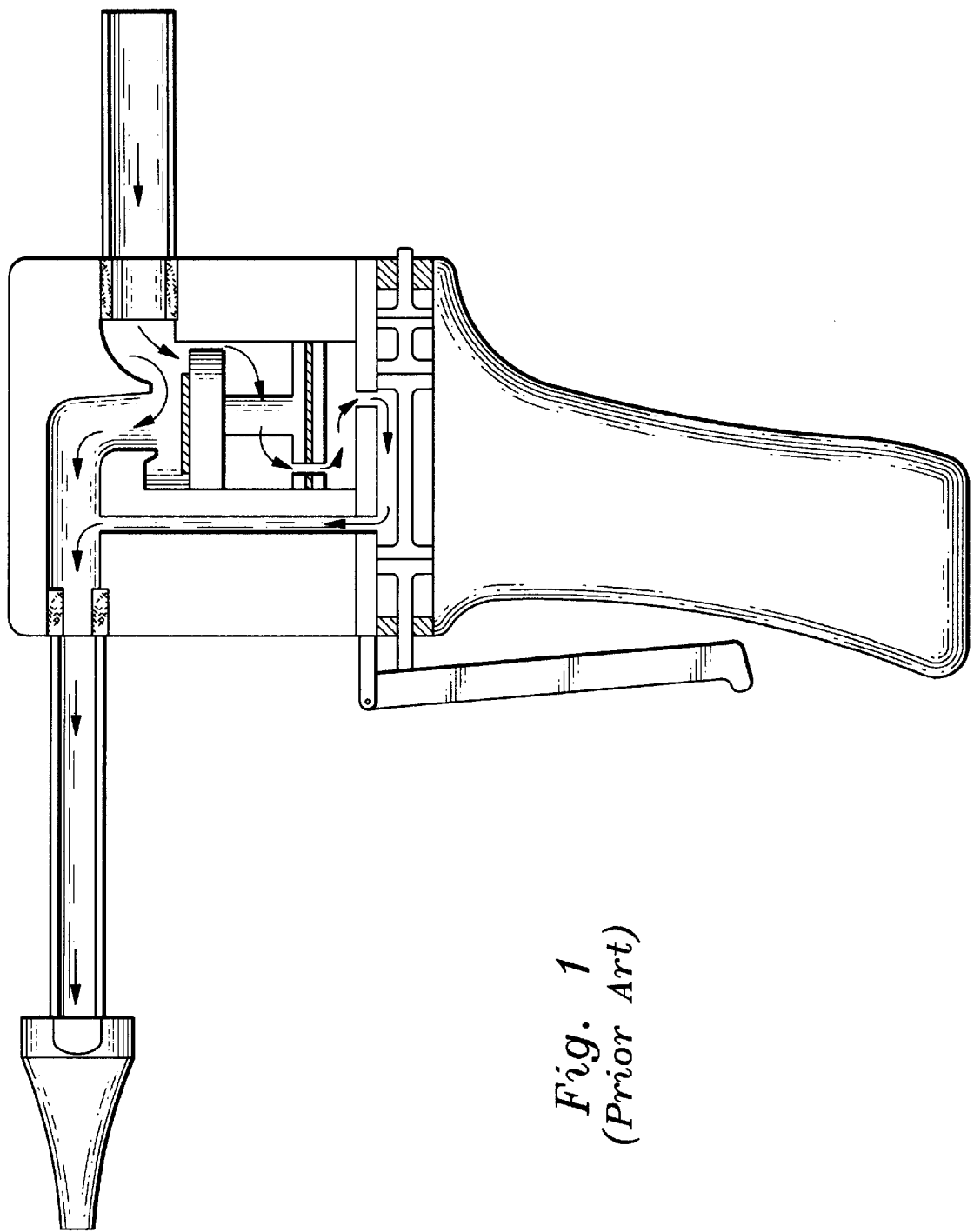
FIG. 1 is a vertical sectional view of a prior art gun in its operating position.

FIG. 1 is a sectional view of previously discussed Duncan prior art wash gun.

Figure 2:
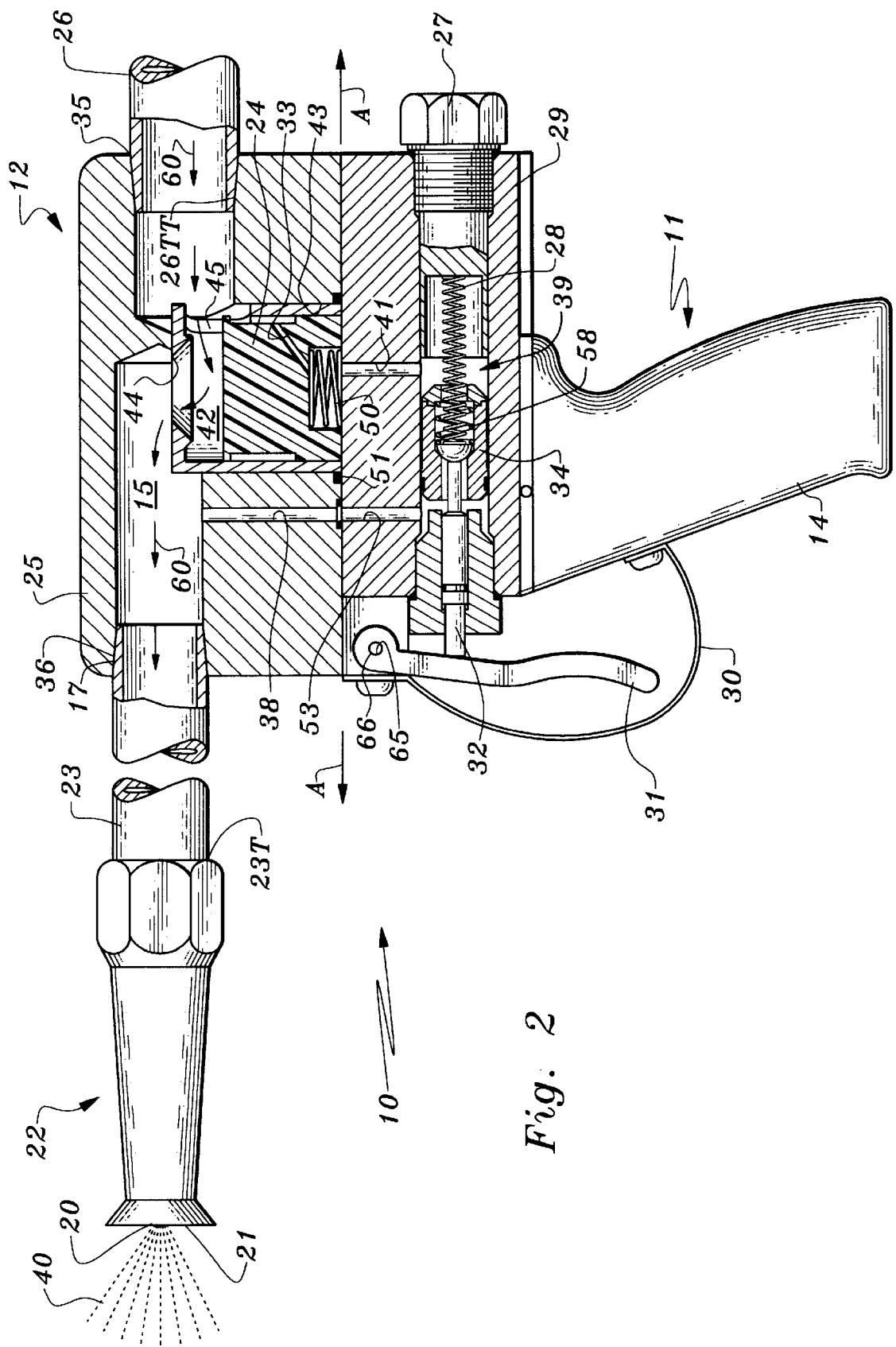
FIG. 2 is a left facing vertical sectional view of the apparatus of this invention.

Referring now to FIG. 2 of the invention, a water gun 10 is shown having a lower portion 11, which includes a pistol grip 14, and a main body portion 12 coupled to lower portion 11 and an outlet barrel portion 23 extending away from body portion 12 and fluidly coupled thereto. A trigger 31 is coupled to the lower portion 11 for actuating the fluid flow as will be discussed.

The main body portion comprises an upper valve housing 25 coupled to a lower valve housing 29, which in turn has the pistol grip, 11 attached thereto. Each of the upper and lower valve housings 25, 29 will be more particularly described.

Main body portion 12 houses the operating mechanism of gun 10 and includes an L-shaped passageway or port 15 in fluid communication at one end with barrel portion 23. As seen in FIG. 2 barrel portion 23 may include a threaded end 36 adapted to mate with like threads on the interior of port 15. The engagement of threads 36, 32 may be fluid tight as this arrangement provides for a flow of fluid from port 15, through barrel portion 23 and out a venturi 21 mounted at the distal end 23T of barrel portion 23. Nozzle 22 may be removably secured to barrel portion 23, such as by a snap fitting or by being preferably threaded thereto, or even permanently secured thereto. Nozzle 22 may be shaped as indicated by the shape of the inner wall to provide a restricted opening 20 at end 21 and may be brass with preferably an inner stainless steel wall.

Figure 6:
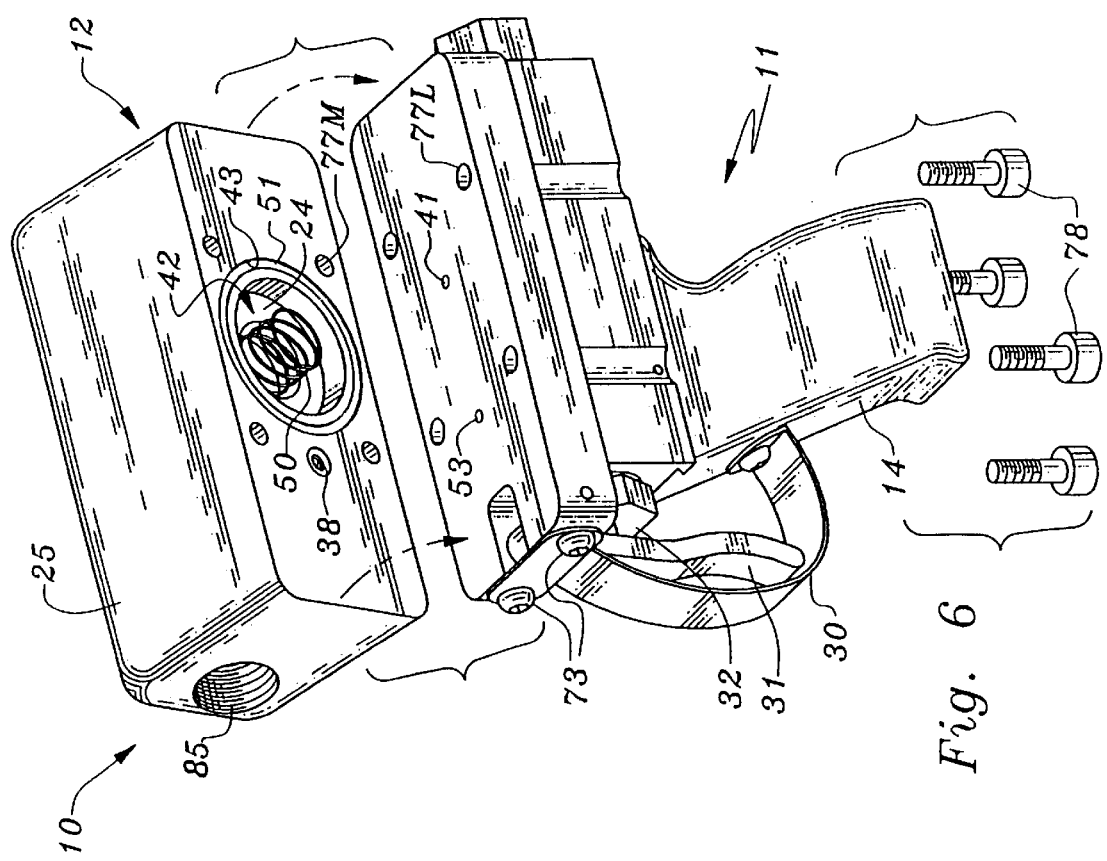
FIG. 6 is a perspective view through the line 6—6 of FIG. 4.

Port 15 fluidly communicates at its rear via opening 44 with an enlarged inner chamber 42, which is disposed internally within body portion 12 through its top opening 43 therein. This inner chamber houses a spring loaded piston 24. The spring; namely, coil spring 50 fits vertically beneath piston 24 as is seen in FIG. 6 within the opening 43 of the chamber 42. An O-ring 51 seals off the opening 43, as is again seen in FIG. 6.

The inner chamber 42 of the upper housing 25 has one other opening therein, namely rear opening 45 which is in fluid communication with threaded inlet 35. See FIG. 2. An inlet pipe 26 having a tapered pipe thread 26TT threadedly engages with inlet 85 for the introduction of fluid into the gun of this invention. Piston 24 also includes an angularly disposed pressure vent 33 which can communicate via rear opening 45 of the inner chamber 42, only with inlet 35 when the piston is biased by the coil spring, when the spring 50 is relaxed and the piston 24 is in the up position in the valve chamber 42 per FIG. 5. The pressure vent 33 can communicate, via rear opening 45, to the top of chamber 42 and top opening 44; and also via rear opening 45 to inlet 35, when the spring 50 is tensed and the piston is in the down position per FIG. 2.

Port 15 is also threaded at its outer end 17 for the receipt of the tapered threaded end 36 of outlet barrel 23. The outlet barrel is also preferably threaded at its distal end 23D for the receipt of nozzle 22. Nozzle 22 includes a restricted opening 20 at its high pressure end 21 for the outflow of high pressure fluid designated 40.

Thus arrow of movement 60 shows the pattern of fluid flow when the gun's trigger 31 is actuated such that water 40 can move past the piston 24. Normally the spring 50 biases the piston 24 to position upwardly to close off top opening 42 to exit port 15, thus preventing fluid flow. See FIG. 5. The pattern traversed is in through inlet hose 26 into inlet 35, through the rear opening 45 of chamber 42; out top opening 45 of chamber 42 into outlet 15; out threaded opening 17 in outlet 15 through nozzle 22 to the restricted opening 20 toward the target, not seen.

While not shown, inlet hose 26 may be coupled to a conventional fire pump which can serve as a source of pressurized water. Sometimes tanker trucks can serve the same purpose.

Figure 5:
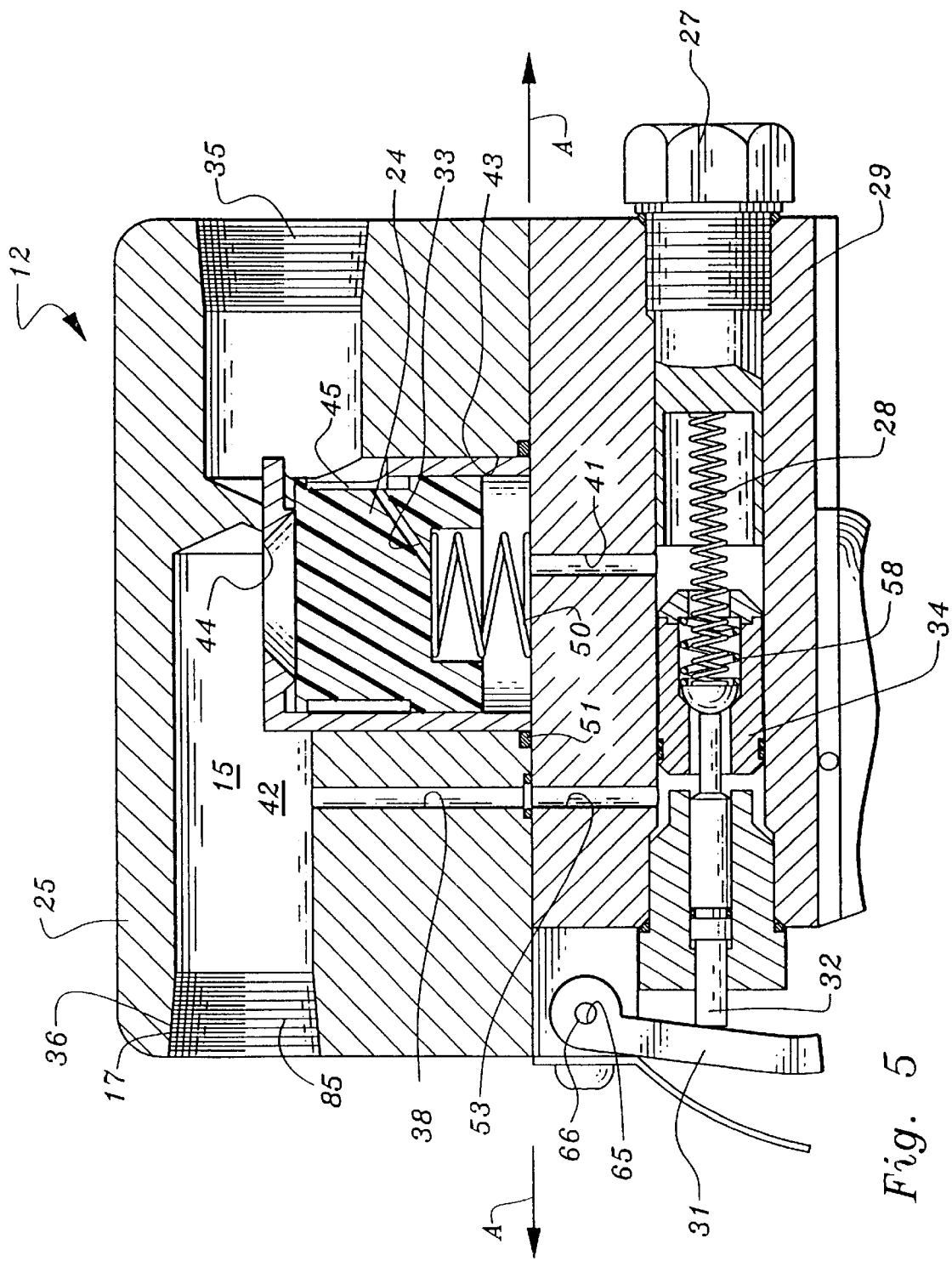
FIG. 5 is a partial side sectional view shown in close-up with the piston closing off the opening from the chamber to the water outlet barrel.

Line A—A seen in both FIGS. 2 and 5 indicates the imaginary line or plane at which assembly of the main body portion 12 takes place to the lower portion 11. Reference is also made to FIG. 6 which shows the two surfaces prior to interconnection.

A first secondary pilot port 38 extends vertically through main body portion 12 to communicate with an aligned second such secondary port 53 in lower portion 14's base 46 to fluidly interconnect exit main port 15 with cartridge chamber 39 of the lower portion 11. See FIG. 3.

The primary pilot port 41 in base 46 fluidly connects cartridge chamber 39 with inner chamber 42.

Also seen in FIGS. 2 and 3 is the pivot pin bore 65 for the receipt of the pivot pin 66 which mounts the trigger. Further discussion on these components will be set forth infra.

The discussion now references FIG. 3, which shows the elements normally disposed within cartridge chamber 39 separated out therefrom in exploded fashion. As can be seen in FIG. 3, chamber 39 extends the full width of the lower portion, from front to back, and is spaced down from top wall 48. Cartridge chamber 39 is internally threaded at its rear end to receive the threaded section 56 of the check cartridge retainer 27. A nut like end 55 is used to tighten the cartridge retainer 27 into position. Almost all of the coil spring 28 resides within the confines of the spring housing section 57, when the spring is at rest. See FIG. 2.

For ease of understanding reference should also be made to FIG. 5, which shows some of these components on a larger scale. A check cartridge 34, having ball bearing 34B, which bearing is slidably disposed on a track 34T within the chamber 39 adjacent the retainer 27 of cartridge 34. Cartridge 34 also has a retaining spring 58 therein which retains the ball against the seat until actuation. An internal spring 28 resides within the retainer spring 58 per FIGS. 2 and 5. With a ball bearing 34B therein, internal spring 28 rests against the ball bearing and serves as a return spring. Plunger and plug 32 comprises a spool of stainless steel, 69 with a biasable plunger 70 therein. When the spring 28 is at rest against the ball bearing 34B, the tip 71 of the plunger 70 extends outwardly of the spool, more so than when the trigger 31 is pressed against the tip 71. Thus the plunger 70 is biased inwardly when actuated by the trigger, thereby compressing the coil spring 28. And the plunger 70 is biased back into position when the trigger is released and the coil spring 28, the return spring then and does relax to its at rest mode.

Figure 7:
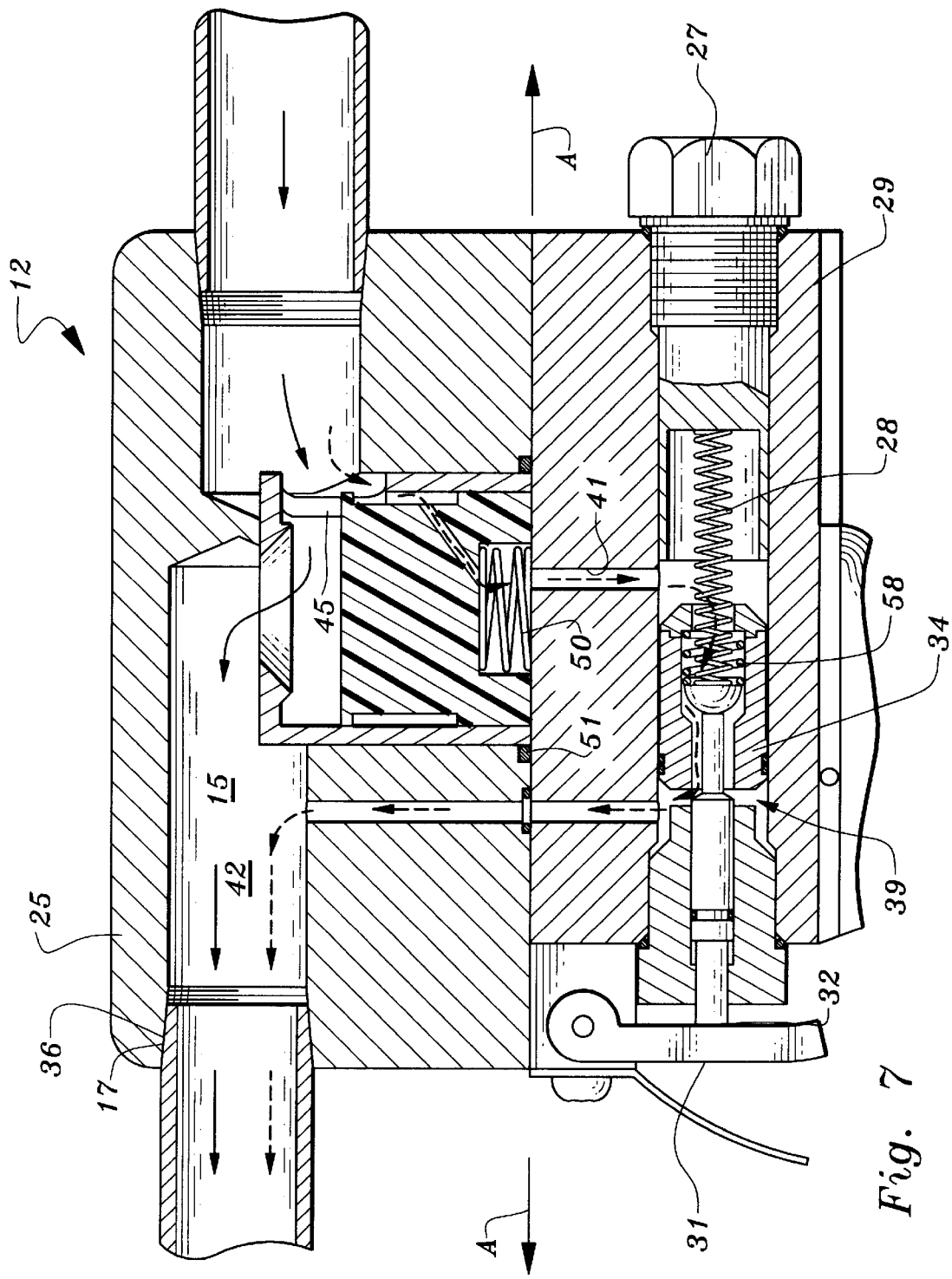
FIG. 7 depicts by hatching the flow of fluid when the trigger is actuated.

Reference is made to FIG. 7 which shows the flow of fluid going from the inlet, through the inner chamber and out top opening 42 to main exit port 15 and forward to the barrel portion, as well as fluid flowing down through the pressure vent and primary pilot port 41, through the cartridge and up the secondary pressure port to mix with the water (fluid) exiting top opening 42 directly into the barrel portion.

Figure 4:
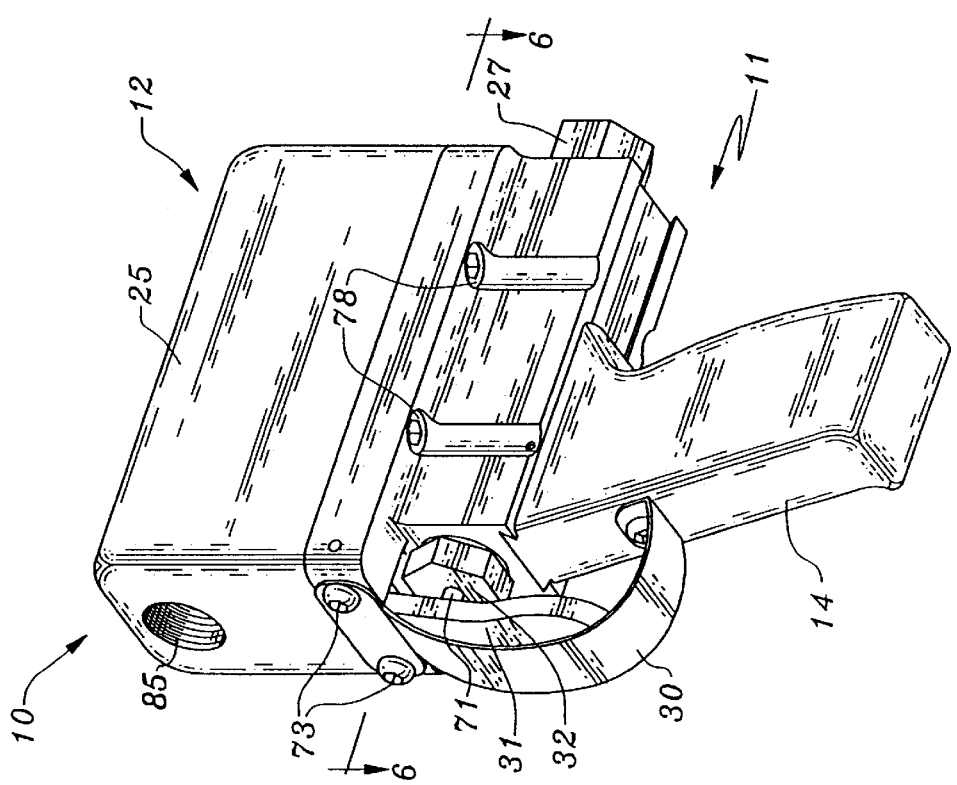
FIG. 4 is a front left perspective view of this apparatus but without the barrel and its nozzle.

From FIGS. 2, 3, and 4 the mode of mounting of the trigger 31 can be discerned. Trigger 31 comprises an elongated piece of metal or plastic having a pair of spaced oppositely directed bends, a first inward, and second outward bend therein as denoted from the proximal end thereof to thus define 3 sections.

As can be seen in FIGS. 3 and 4 there is a front upwardly directed recess 75 for receipt of the trigger 31. See also FIG. 2. A bore 65 through each of the side walls of the lower portion communicates with the recess 75. Pivot pin 66 is inserted though the bore 65, then through bore 67 of the trigger 3 and back out through the second part of bore 65 to pinningly mount the trigger 31 into position.

Trigger guard 30 has a main portion 30M configured somewhat like a stylized-L and which has a normally disposed mounting flange 30T having a pair of bores 30B therein for the receipt of mounting screws 73. An additional bore 30B is found at the end of the main portion distant from the flange. Another mounting screw 73 secures this end to the threaded bore 11B in the pistol grip 11.

Further reference should now be made to FIGS. 2 through 5 for an understanding of the flow of control fluid (water) through the primary and secondary pilot ports and the angled relief port in the piston 33. Inlet water pressure enters the gun through inlet water hose 26 into chamber 42. Then the water passes through pilot port 33 in piston 24, then into primary pilot port 41 which communicates pilot water into cartridge chamber 39. When trigger 15 is in the released mode the pilot water coming from primary port 41 is blocked by the check valve ball 34B which allows pilot pressure to build up under piston 24, thereby pushing piston 24 upward against valve seat, 49. This stops the water flow from inlet 26 to outlet 23. When trigger 31 is depressed against plunger 71, it pushes check valve ball 34B off its seat 62 in cartridge chamber 39 and allows pilot water pressure to flow out of chamber 42 through pilot port 41 into chamber 39. Then the water flows around the unseated pilot ball, and out pilot port 53 into pilot port 38 in upper body 25, then into port 15, which releases pilot pressure into the outlet tube 23, and then into nozzle 22, and finally out to the atmosphere. When this all happens the absence of pilot pressure in the chamber 42 allows the piston 24 to be forced downward off its seat 49 which allows high pressure water to flow from the inlet hose 26 through chamber 42, then out the outlet tube 23.

The discussion now moves to FIG. 6 which is taken along the line of FIG. 4. This figure illustrates the assembly of the main portion 12 to the lower portion 11. Shown disposed into position in the upper main portion are the piston 24, which is retained by the spring 50. The chamber 42 in which the piston rides, has an O-ring 51 at its entrance. The four large assembly bores 77L communicate through the lower portion to the assembly bores 77M in the main body for the receipt of the assembly screws 78, one of which is depicted adjacent the the two portions of the unit. See also FIG. 4, wherein the re are optional grooves cut to ease the assembly screws 78 into place. The assembly screws are disposed at the end of the grooves 79, but not seen in this drawing.

The unit of this invention is easily disassembled since the inlet hose and outlet barrel are both pipe threaded. Four assembly screws allow access to change the piston, O-ring and spring as may be needed. All of this is field accomplishable. Even the spool and check cartridge can be field disassembled using but a single large crescent wrench.

It is seen that I have described a water gun that can be operated easily with one hand and with minimum finger pressure as compared to the prior art guns. This unit having a construction different from the gun that I have previously disclosed and claimed in my U.S. Pat. No. 4,406,383 is capable of field service, whereas my previous gun was not. This is indeed a benefit, because it has been shown by experience that people in the field do not take good care of these wash guns. They are subject to dust, dirt and grime during the course of day-to-day use.

It is due to this heavy field use, that stainless steel and similar structural elements such as Delrin® or Nylon® or Teflon® are recommended for the various valves employed herein.

It has also been found that operator fatigue from using the gun has been minimalized due to the nature of the construction with the employment of the primary and secondary pilot holes for balance during operation of the gun. The addition of the trigger guard prevents accidental firings, and the prevention of injuries.

By utilizing a primary pilot port of greater cross section than the secondary pilot port that leads from the cartridge chamber to the port, the potential for back pressure is diminished.

The wash guns of this application will be utilized by the utilities, railroads and other institutions that have a need to clean insulators on power lines, transformers, and other electrical industry equipment. They can also be used by such industries as the railroads for cleaning locomotives and freight cars as may be desired or necessary.

Since certain changes may be made in the above described apparatus without departing from the scope of the invention herein involved, it is intended that all matter contained in the above description and in the accompanying drawings, if present, shall be interpreted as illustrative only and not in a limiting sense.

I claim:

1. A water gun for the delivery of water under high pressure which gun comprises a lower portion coupled to a main body portion and an outlet barrel portion extending away from the main body portion and fluidly coupled thereto;

the main body portion of which comprises an upper valve housing being coupled to a lower valve housing;

said main body portion having a water inlet leading into an inner chamber of said upper valve housing;

a water outlet leading out of said upper valve housing and which outlet is the exit main port;

said inner chamber having a top opening in fluid communication with said water outlet;

a spring biased piston disposed within said inner chamber, said piston having an angularly disposed pressure vent, a trigger actuated spool disposed within a check cartridge within the lower portion;

a secondary pilot port fluidly communicating between said exit main port and said check cartridge;

a pressure vent in fluid communication with said inlet, and in communication with said main exit outlet, when the spring biasing the piston is tensed;

a primary pilot port in communication between the inner chamber and said cartridge, whereby the spring biased piston which normally closes off fluid communication from said inner chamber to said exit main port is moved downwardly and away from said top opening when said spool is trigger actuated.

2. In the water gun of claim 1 further including a nozzle removably secured to the barrel portion.

3. In the water gun of claim 1 wherein the primary pilot port is of greater cross section than the secondary pilot port to reduce back pressure.

4. The wash gun of claim 1 further including a pistol grip attached to the lower portion.

5. The wash gun of claim 4 further including a trigger guard attached to both said lower portion and to said pistol grip and a trigger pivotally mounted on said gun for actuating said spool.

6. The wash gun of claim 5 wherein the trigger actuated cartridge disposed spool comprises: a check cartridge having ball bearing therein, which bearing is retained by a first spring; and a second spring disposed within the first spring to serve as a return spring when the trigger actuation has ben terminated.

7. In the wash gun of claim 1 wherein a venturi is disposed at one end of the outlet barrel portion.

8. In the wash gun of claim 1 wherein the water inlet has a tapered threaded pipe connection.

9. In the wash gun of claim 1 wherein the barrel portion is threadedly removably secured to the main body portion and has a venturi thereon.

10. A water gun for the delivery of water under high pressure which gun comprises a lower portion coupled to a main body portion and an outlet barrel portion removably secured thereto extending away from the main body portion and fluidly coupled thereto;

the main body portion of which comprises an upper valve housing being coupled to a lower valve housing;

said main body portion having a water inlet leading into an inner chamber of said upper valve housing;

a water outlet leading out of said upper valve housing and which outlet is the exit ain port;

said inner chamber having a top opening in fluid communication with said water outlet;

a spring biased piston disposed within said inner chamber, said piston having an angularly disposed pressure vent, a trigger actuated spool comprising a movable ball bearing disposed within a check cartridge located within the lower portion;

a secondary pilot port fluidly communicating between said exit main port and said check cartridge;

a pressure vent in fluid communication with said inlet, and in communication with said main exit outlet, when the spring biasing the piston is tensed;

a primary pilot port in communication between the inner chamber and said check cartridge, and a trigger pivotally mounted on said gun for actuating said spool;

whereby the spring biased piston which normally closes off fluid communication from said inner chamber to said exit main port is moved downwardly and away from said top opening when said spool is trigger actuated.

11. The wash gun of claim 10 including a pistol grip mounted on said lower portion.

12. The wash gun of claim 11 further including a trigger guard mounted to said lower portion and to said pistol grip.

13. The wash gun of claim 10 wherein the check cartridge is removably mounted for easy servicing.

* * * * *